(12) United States Patent
Hsueh

(10) Patent No.: US 8,240,693 B2
(45) Date of Patent: Aug. 14, 2012

(54) BICYCLE REAR WHEEL AXLE POSITIONING DEVICE

(76) Inventor: Ronald Hsueh, Huntington Beach, CA (US)

( * ) Notice: Subject to any disclaimer, the term of this patent is extended or adjusted under 35 U.S.C. 154(b) by 43 days.

(21) Appl. No.: 13/008,013

(22) Filed: Jan. 18, 2011

(65) Prior Publication Data

US 2012/0181775 A1    Jul. 19, 2012

(51) Int. Cl.
*B62K 25/20* (2006.01)
(52) U.S. Cl. ..................... 280/281.1; 280/284
(58) Field of Classification Search ............... 280/281.1, 280/284, 288
See application file for complete search history.

(56) References Cited

U.S. PATENT DOCUMENTS

| | | | | |
|---|---|---|---|---|
| 5,082,303 A * | 1/1992 | Duehring et al. | ............. | 280/288 |
| 5,357,643 A * | 10/1994 | Seals | ................... | 7/138 |
| 5,791,673 A * | 8/1998 | Patterson | .................... | 280/281.1 |
| 7,090,231 B1 * | 8/2006 | Liao | ........................... | 280/47.38 |
| 7,472,918 B2 * | 1/2009 | Turner | ........................... | 280/284 |
| 7,854,441 B2 * | 12/2010 | Scurlock | ........................ | 280/261 |
| 8,087,686 B1 * | 1/2012 | Carroll et al. | ................... | 280/288 |
| 2002/0140201 A1 * | 10/2002 | Kirk | ................................ | 280/279 |
| 2004/0036251 A1 * | 2/2004 | Baldwin | ........................ | 280/284 |
| 2008/0272253 A1 * | 11/2008 | Tseng | ............................ | 248/200 |
| 2011/0079984 A1 * | 4/2011 | Inoue et al. | ................ | 280/281.1 |
| 2011/0278818 A1 * | 11/2011 | Talavasek et al. | ............. | 280/288 |

* cited by examiner

*Primary Examiner* — Tashiana Adams
(74) *Attorney, Agent, or Firm* — Lin & Associates IP, Inc.

(57) ABSTRACT

A bicycle rear wheel axle positioning device includes a rod having a curved surface and a flat surface. The rod is connected with a seat stay and a chain stay. A clamp member has a clamp portion and the rod extends through a passage in the clamp portion, wherein the periphery of the passage is corresponding to the curved surface and the flat surface. A first resilient portion and a second resilient portion extend from the clamp portion, respectively. The rear wheel axle is inserted into one side of the clamp portion and the clamp member is movable along the rod. The other side of the clamp portion includes a protrusion which is engaged with one of positioning grooves defined in the curved surface of the rod when the axle is moved to a desired position and a fastening member extends through the two resilient portions.

3 Claims, 9 Drawing Sheets

BICYCLE REAR WHEEL AXLE POSITIONING DEVICE

BACKGROUND OF THE INVENTION

1. Field of the Invention

The present invention relates generally to a bicycle rear wheel axle positioning device which is mounted onto a rear portion of a bicycle frame and capable of easily adjusting positions of the rear wheel axle.

2. The Prior Arts

A conventional transmission system for a bicycle includes a chain wheel and a rear sprocket. The chain wheel is disposed at a front portion of a bicycle frame and connected to two cranks which are respectively connected with two pedals. The rear sprocket is disposed to a side of a hub and fixed to an axle of a rear wheel. A drive chain is connected between the chain wheel and the rear sprocket. When the cyclist treads the pedals, the chain wheel rotates to drive the rear sprocket by the drive chain. Because the rear sprocket is fixed to the axle of the rear wheel, the rear wheel is rotated to move the bicycle forward. A derailleur system includes multiple rear sprockets in different diameters and the drive chain is shifted between the rear sprockets to get the desired speed.

Because the drive chain is a closed loop, when mounting the drive chain to the chain wheel and the rear sprocket, the distance between the chain wheel and the rear sprocket has to be shortened, so as to easily mount the drive chain to the chain wheel and the rear sprocket. Then the distance between the chain wheel and the rear sprocket is adjusted to tighten the drive chain, such that the drive chain does not disengage from either of the chain wheel or the rear sprocket. Because the chain wheel is fixed to the front portion of the bicycle frame, it usually moves the rear sprocket to adjust the distance between the chain wheel and the rear sprocket. Referring to FIG. 1, each of the chain stays of the conventional bicycle is connected to a wheel axle positioning device "A". The wheel axle positioning devices "A" each have a groove "A1" which can be horizontal, inclined or any pattern. Two ends of the axle B1 of the rear wheel "B" is movable along the two grooves "A1", respectively. After the drive chain is assembled, the axle B1 is moved to a position of the wheel axle positioning devices "A" to tighten the drive chain and nuts "C" are used to fix the axle B1 to the wheel axle positioning devices "A".

The connection between the wheel axle positioning devices "A" and the axle B1 is fixed by the friction when the nuts C are tightly installed. After being used for a period of time, the wearing between the nuts C and the wheel axle positioning devices "A", and the wearing between the groove A1 and the axle B1 may cause gaps which mean the nuts C need to be fastened again to tighten the connection. Moreover, the axle B1 in the groove A1 may rotate relative to the groove A1, which changes the central position of the axle B1.

SUMMARY OF THE INVENTION

A primary objective of the present invention is to provide a bicycle rear wheel axle positioning device for easily adjusting position of the rear wheel axle, and the positioning device improves all of the shortcomings mentioned above.

The characteristic of the present invention is that a bicycle rear wheel axle positioning device includes a rod member and a clamp member. The rod member is connected to a bicycle frame, and the clamp member is mounted to the rod member and connected with an axle of a rear wheel. The rod member has a rod whose cross section is not circular. The clamp member has a shape corresponding to the outer contour of the rod and is connected thereto so that the clamp member is movable along the rod. Because the axle of the rear wheel is connected with the clamp member, the axle can move along the rod to various positions. Moreover, because the shapes of the rod and the clamp member are corresponding to each other, the clamp member does not rotate relative to the rod.

Another characteristic of the present invention is that the clamp member clamps to the rod and a securing means is provided between the rod and the clamp member to further fasten the clamp member with the rod, which prevents the clamp member from moving relative to the rod.

In order to achieve the objective, a bicycle rear wheel axle positioning device according to the present invention comprises a rod member and a clamp member. The rod member includes a rod having a curved surface and a flat surface facing with each other. The clamp member has a clamp portion which has a passage defined therein and a periphery of the passage is corresponding to the curved surface and the flat surface of the rod. A first resilient portion and a second resilient portion extend from two sides of the clamp portion, respectively. The rod is received in a passage of the clamp portion, which allows the rod to move relative to the clamp portion but prevents the rod from rotating relative to the clamp portion. The first resilient portion and the second resilient portion have a first hole and a second hole, respectively. A fastening member extends through the first hole and the second hole to make the clamp member clamping the rod. The clamp portion includes a through hole in one side for accommodating a wheel axle.

A positioning hole is defined in the other side of the clamp portion and a protrusion extends from an inner periphery of the positioning hole. A plurality of positioning grooves is defined in an axial direction of the curved surface of the rod. When the clamp member is fixed by the fastening member, the protrusion is not engaged with any of the positioning grooves and the clamp member is movable along the rod. When the fastening member fastens the clamp member, the protrusion is engaged with one of the positioning grooves to prevent the clamp member from moving relative to the rod.

The clamp portion is preferred to include a curved wall and a flat wall, and the first resilient portion extends from the curved wall and the second resilient portion extends from the flat wall.

BRIEF DESCRIPTION OF THE DRAWINGS

The present invention will be apparent to those skilled in the art by reading the following detailed description of a preferred embodiment thereof, with reference to the attached drawings, in which.

DETAILED DESCRIPTION OF THE PREFERRED EMBODIMENT

Figure 7:
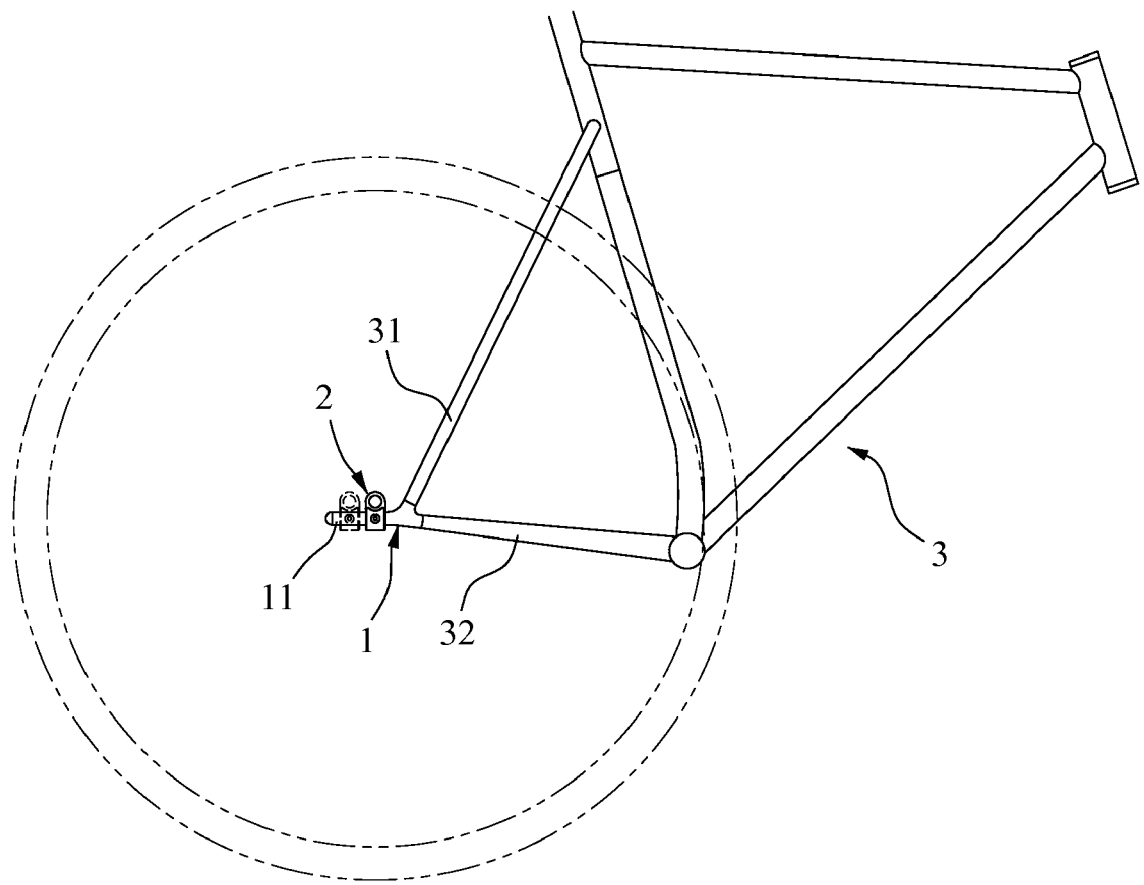
FIG. 7 shows the rod member and the clamp member according to the present invention mounted to a bicycle frame and a rear wheel.

With reference to the drawings and in particular to FIGS. 2, 3, 3A and 7, a bicycle rear wheel axle positioning device according to a preferred embodiment of the present invention is mounted on a bicycle frame 3 and comprises a rod member 1 and a clamp member 2. The rod member 1 includes a rod 11 having a curved surface 111 and a flat surface 112 located adjacent to the curved surface 111. The curved surface 111 and the flat surface 112 are preferred to be located at symmetric locations of the rod 11. The rod 11 includes a first tube 12 extending upward at a first angle and a second tube 13 extending downward at a second angle, wherein the second angle is smaller than the first angle. The flat surface 112 includes an axial groove 1121 along an axial direction thereof. A plurality of positioning grooves 113 are distributed in the curved surface 111 of the rod 11 along an axial direction of the rod 11. As shown in FIG. 7, the first tube 12 and the second tube 13 are connected with the seat stay 31 and the chain stay 32 of the bicycle frame 3, respectively.

Figure 1:
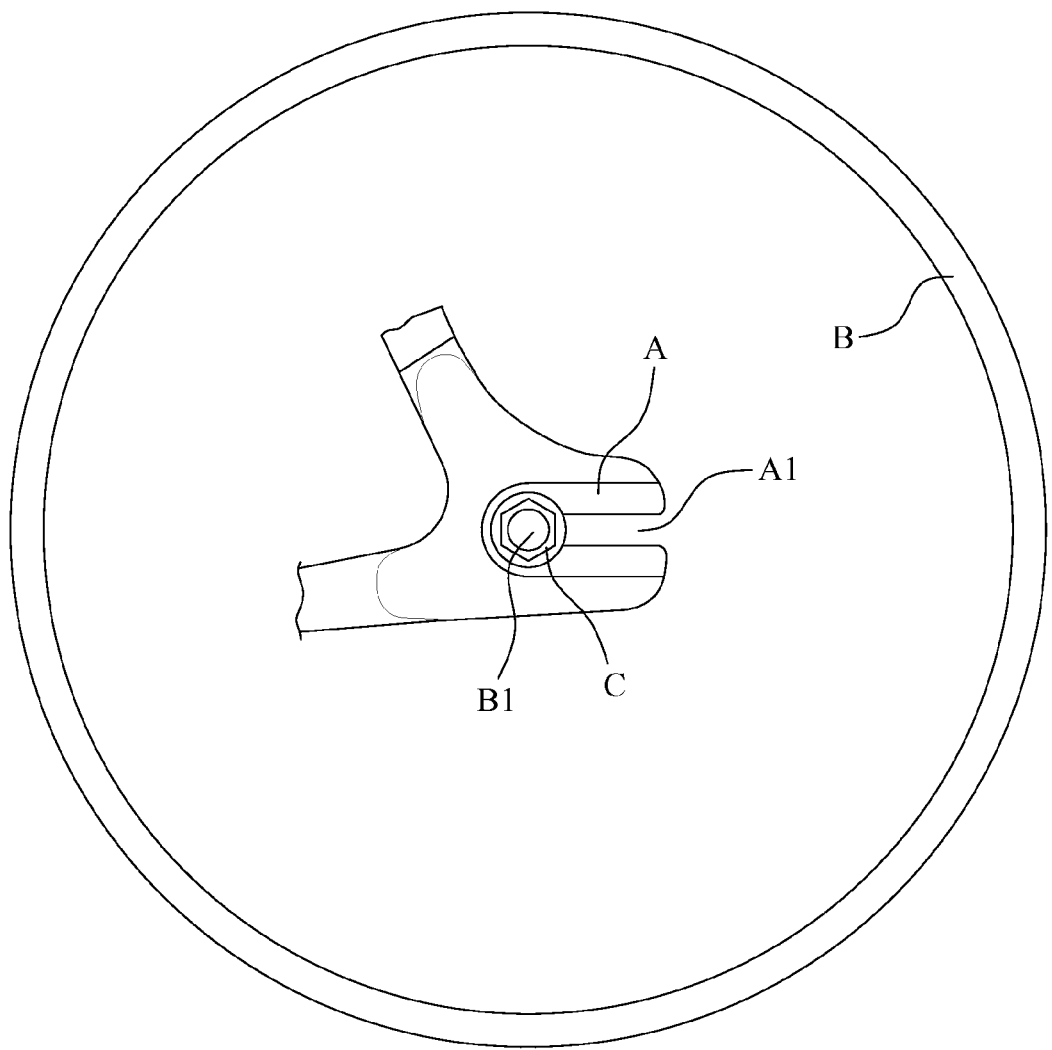
FIG. 1 shows a conventional way to connect a rear wheel axle to a rear wheel axle positioning device.
Figure 2:
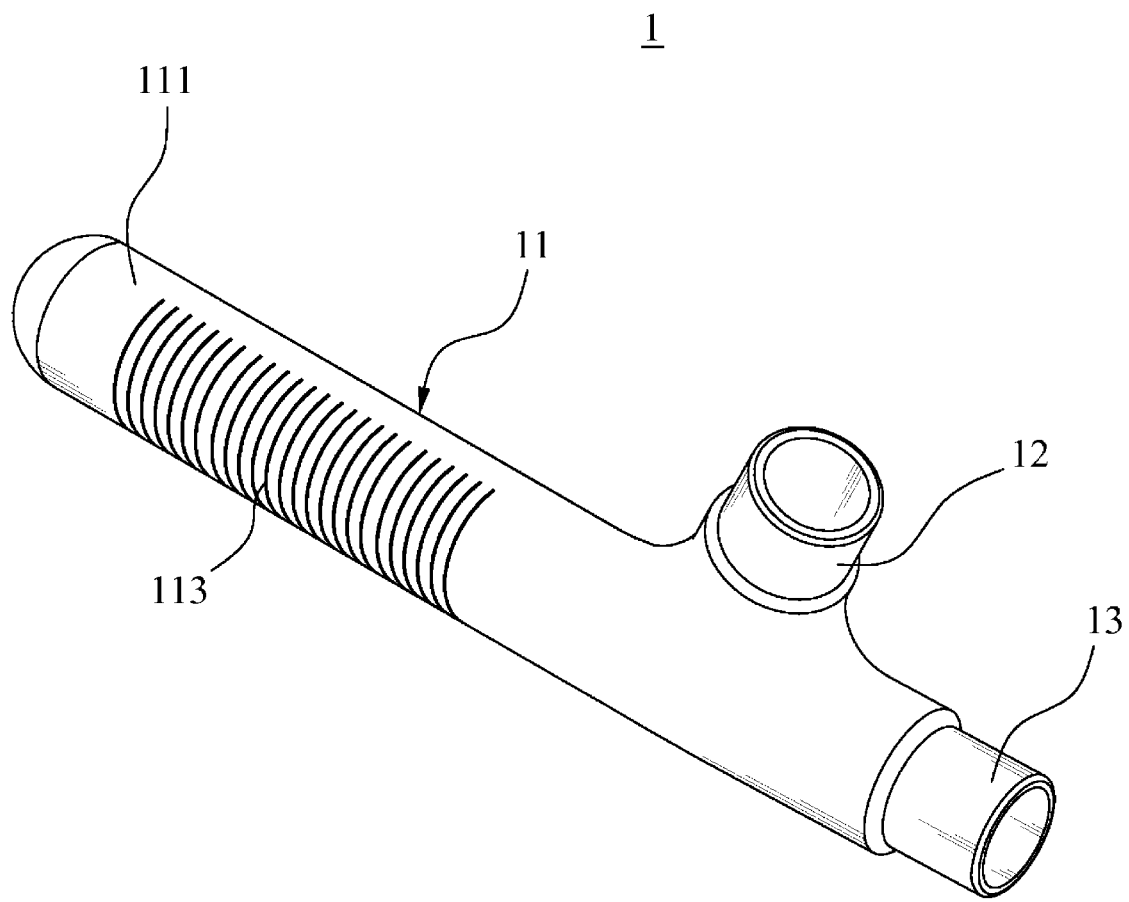
FIG. 2 is a perspective view showing a rod member of a bicycle rear wheel axle positioning device according to the present invention.
Figure 3:
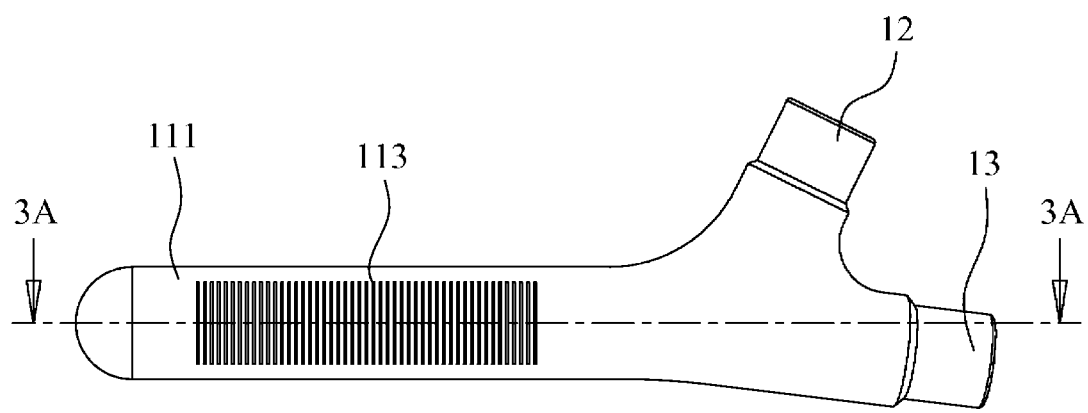
FIG. 3 is a side view showing the rod member according to the present invention.
Figure 3A:
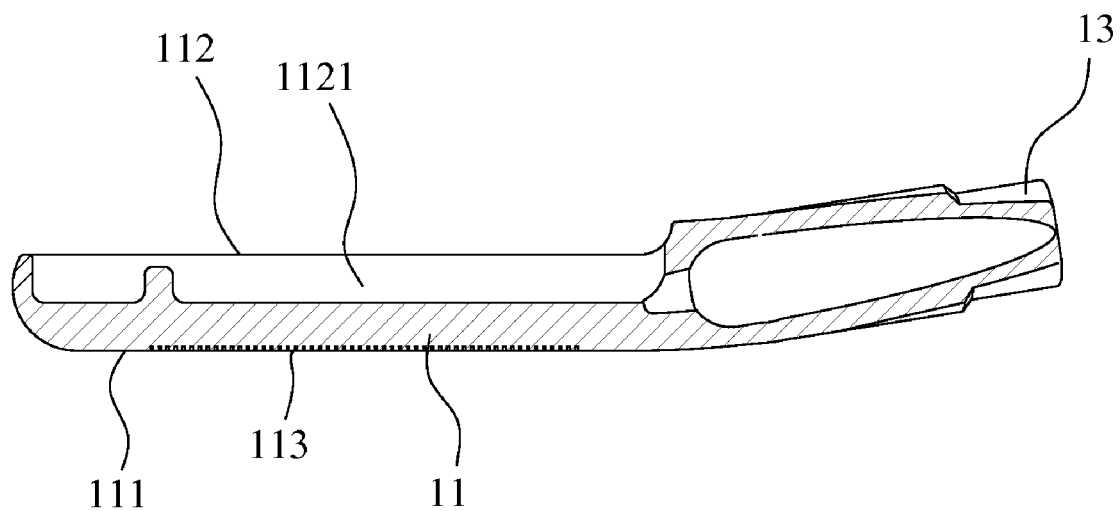
FIG. 3A is a cross sectional view taken along line 3A-3A of FIG. 3.
Figure 4:
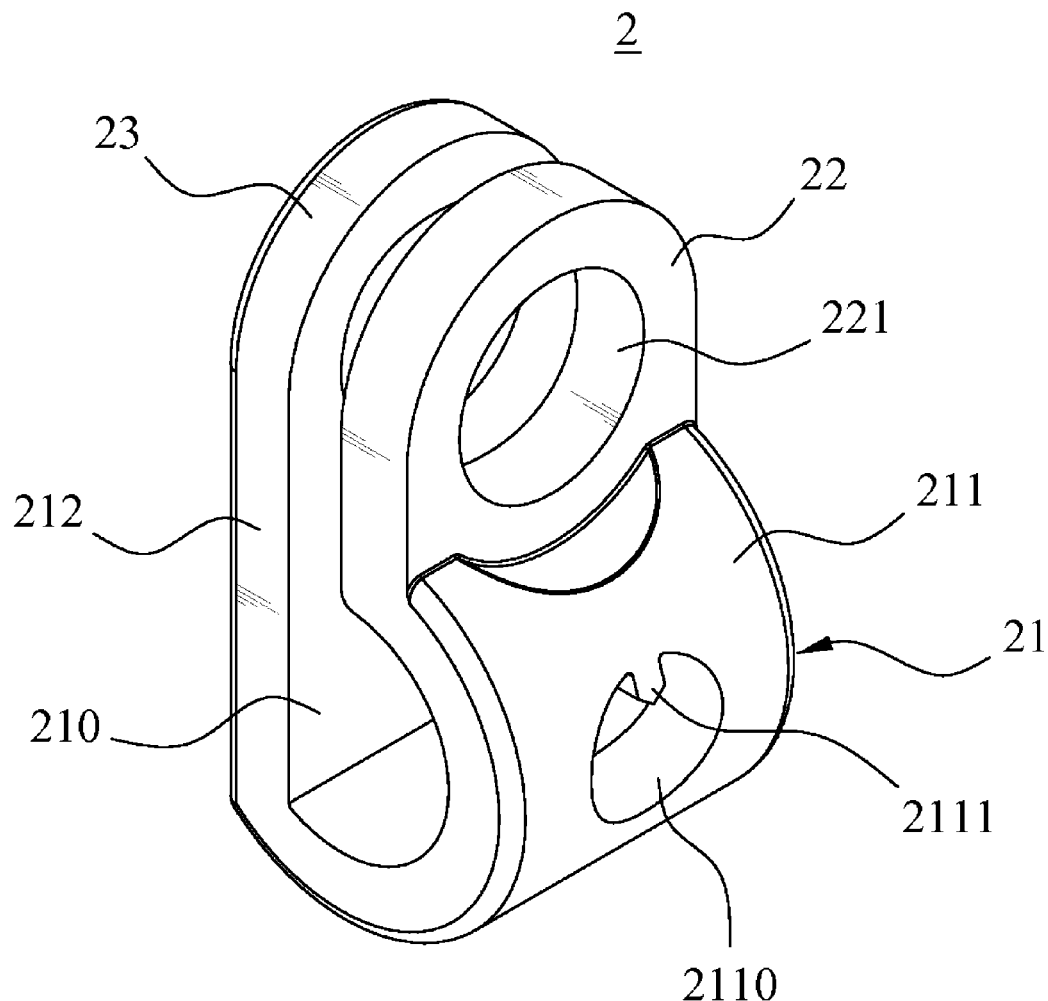
FIG. 4 is a perspective view showing a clamp member of the bicycle rear wheel axle positioning device according to the present invention.
Figure 5:
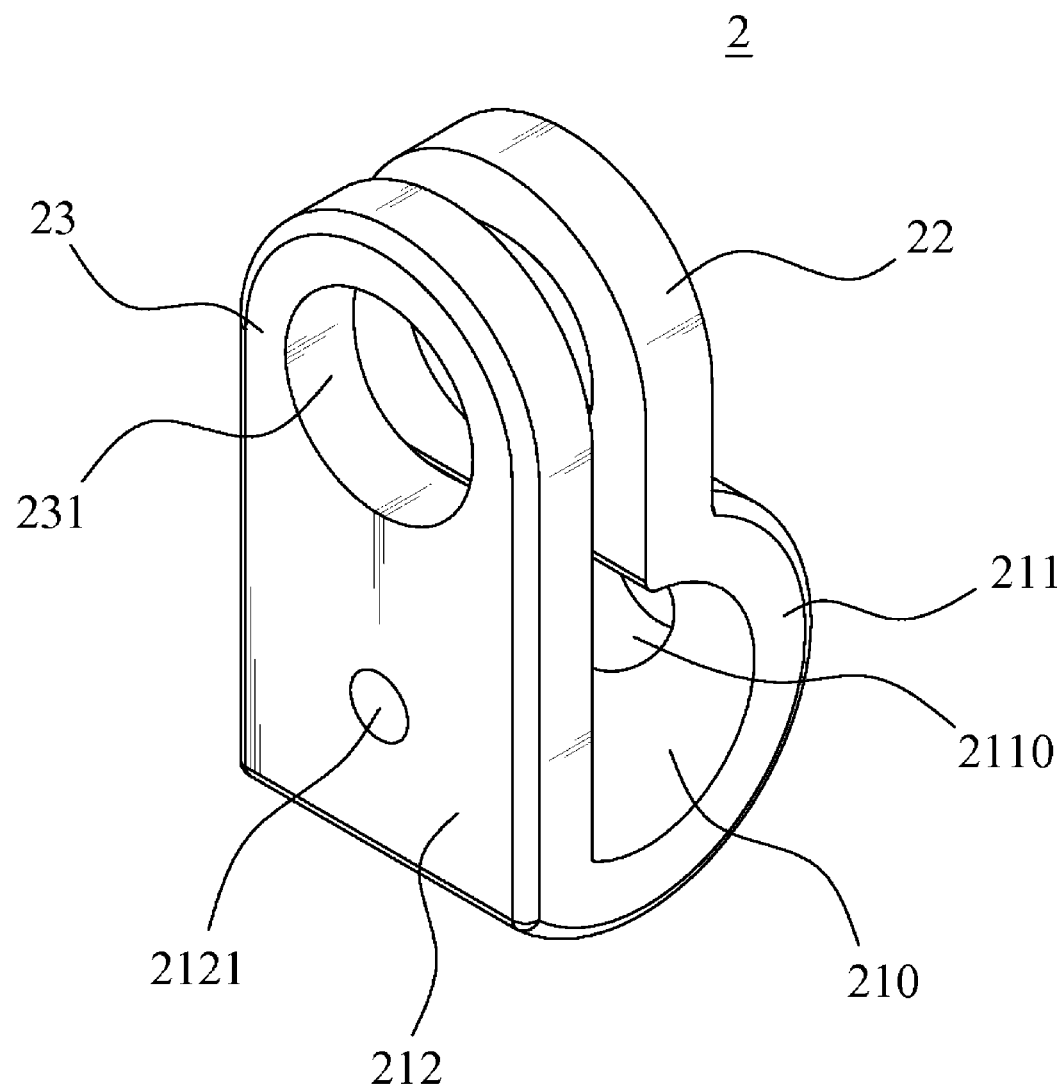
FIG. 5 is another perspective view of the clamp member according to the present invention.
Figure 6:
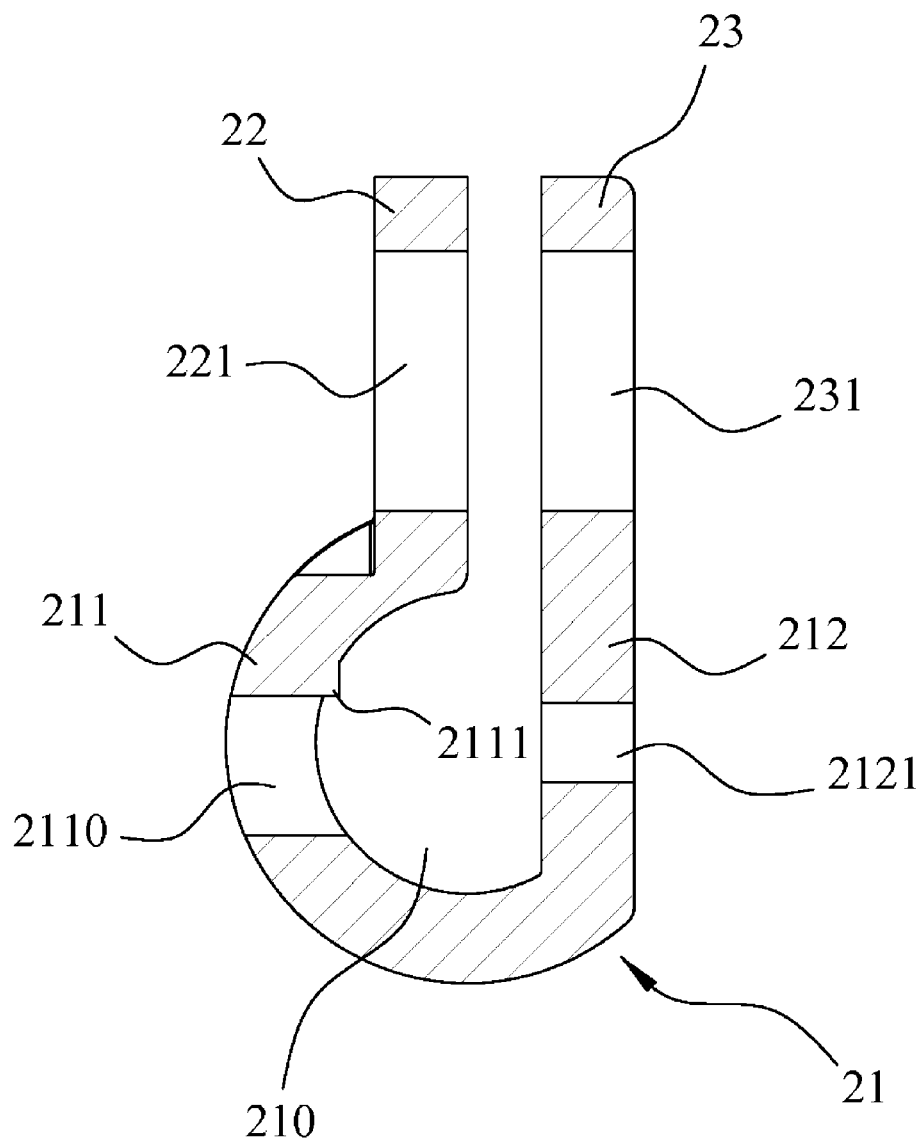
FIG. 6 is a cross sectional view of the clamp member according to the present invention.

As shown in FIGS. 4, 5 and 6, the clamp member 2 is made of metal and integrally formed. The clamp member 2 comprises a clamp portion 21. The clamp portion 21 includes a curved wall 211 and a flat wall 212. A passage 210 is defined between the curved wall 211 and the flat wall 212, and a periphery of the passage is corresponding to the curved surface 111 and the flat surface 112 of the rod 11. A positioning hole 2110 is defined through the curved wall 211 and a protrusion 2111 extends from the inner periphery of the positioning hole 2110. The flat wall 212 has a through hole 2121 which is located in alignment with the positioning hole 2110. A first resilient portion 22 extends from the curved wall 211 and a second resilient portion 23 extends from the flat wall 212. A gap is defined between the first and second resilient portions 22, 23. When two force of opposite directions are applied to the first and second resilient portions 22, 23, the first and second resilient portions 22, 23 can be deformed and moved toward each other. The first resilient portion 22 has a first hole 221 and the second resilient portion 23 has a second hole 231 corresponding to the first hole 221.

Figure 8:
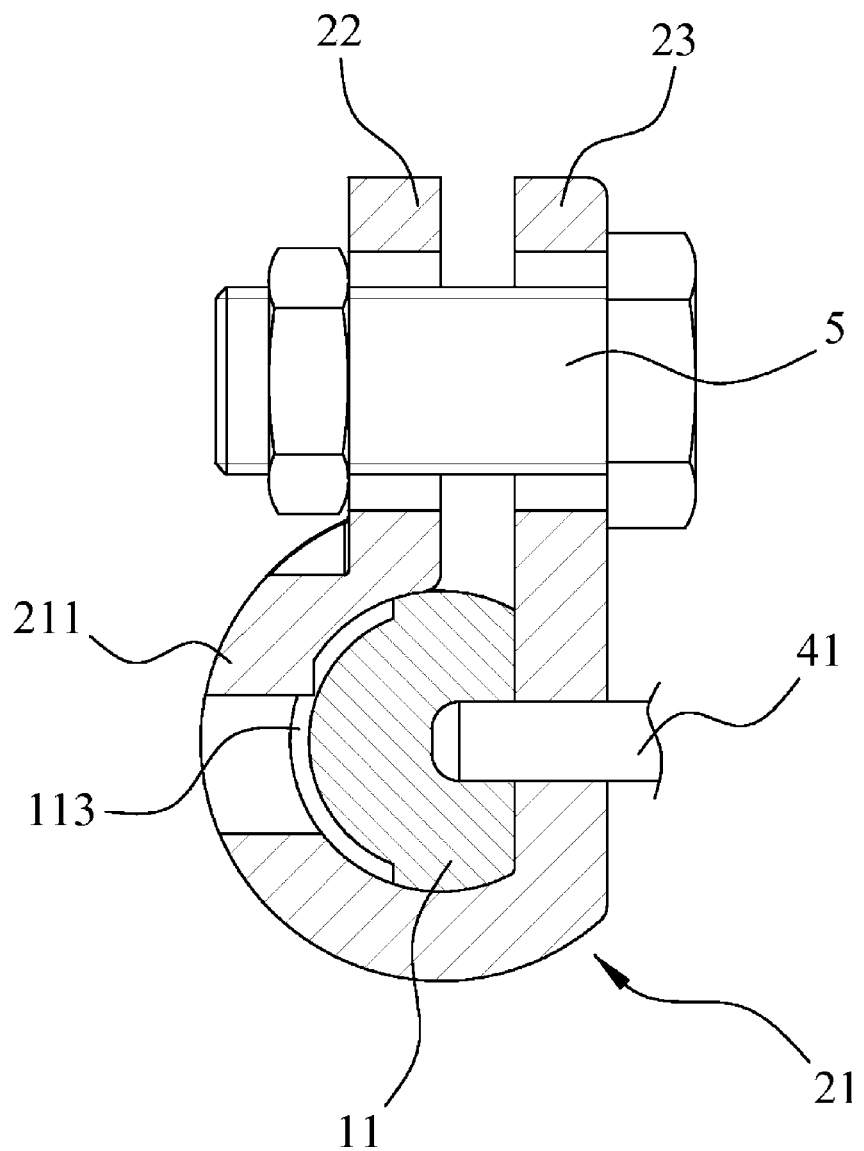
FIG. 8 is a cross sectional view showing that the clamp member is tightened to securely hold the rod member and a protrusion of the clamp member is engaged with a groove of the rod member.

Referring to FIGS. 6, 7 and 8, when using the bicycle rear wheel axle positioning devices according to the present invention, the two rod members 1 and the two clamp members 2 are disposed at two sides of the bicycle frame 3, respectively. The first tube 12 and the second tube 13 are respectively connected to the seat stay 31 and the chain stay 32 of the bicycle frame 3. The two clamp members 2 are mounted to the two rods 11, respectively. The rod 11 extends through the passage 210 of the clamp member 2 corresponding thereto. By the guidance of the flat wall 212, the clamp member 2 can move along the rod 11 but does not rotate relative to the rod 11. Two ends of an axle 41 of a rear wheel are inserted into the through holes 2121 of the two clamp members 2, respectively. When the first and second resilient portions 22, 23 are not tightly clamped, the protrusion 2111 is not engaged with any of the positioning grooves 113 of the rod 11, so that the clamp member 2 can move along the rod 11 to adjust the position of the axle 41 of the rear wheel. When the axle 41 is moved to a desired position, a fastening member 5 such as a bolt extends through the first and second holes 221, 231, and cooperates with nuts to force the first and second resilient portions 22, 23 moving toward each other. Therefore, the rod 11 is securely clamped by the clamp portion 21 of the clamp member 2 and the protrusion 2111 is engaged with one of the positioning grooves 113 as shown in FIG. 8 to ensure that the clamp member 2 does not move relative to the rod 11. By the bicycle rear wheel axle positioning device according to the present invention, the adjustment of the position of the rear wheel axle 41 is convenient.

Although the present invention has been described with reference to the preferred embodiment thereof, it is apparent to those skilled in the art that a variety of modifications and changes may be made without departing from the scope of the present invention which is intended to be defined by the appended claims.

What is claimed is:

1. A bicycle rear wheel axle positioning device, comprising:
   a rod member mounted on a bicycle frame and including a rod, the rod having a curved surface and a flat surface located adjacent to the curved surface;
   a clamp member having a clamp portion which has a passage defined therein, a periphery of the passage being corresponding to the curved surface and the flat surface of the rod, a first resilient portion and a second resilient portion respectively extending from two sides of the clamp portion, one of the sides of the clamp portion including a through hole for accommodating a wheel axle, the first resilient portion having a first hole and the second resilient portion having a second hole corresponding to the first hole; and
   a fastening member extending through the first hole and the second hole.

2. The device as claimed in claim 1, wherein a positioning hole is defined in the other side of the clamp portion, a protrusion extends from an inner periphery of the positioning hole, a plurality of positioning grooves are distributed in the curved surface of the rod along an axial direction of the rod.

3. The device as claimed in claim 1, wherein the clamp portion includes a curved wall and a flat wall, the first resilient portion extends from the curved wall and the second resilient portion extends from the flat wall.

* * * * *